Jan. 7, 1969  H. D. SHORT  3,420,943
VENTILATED UNDERGROUND HOUSING FOR ELECTRICAL APPARATUS
Filed Nov. 9, 1966
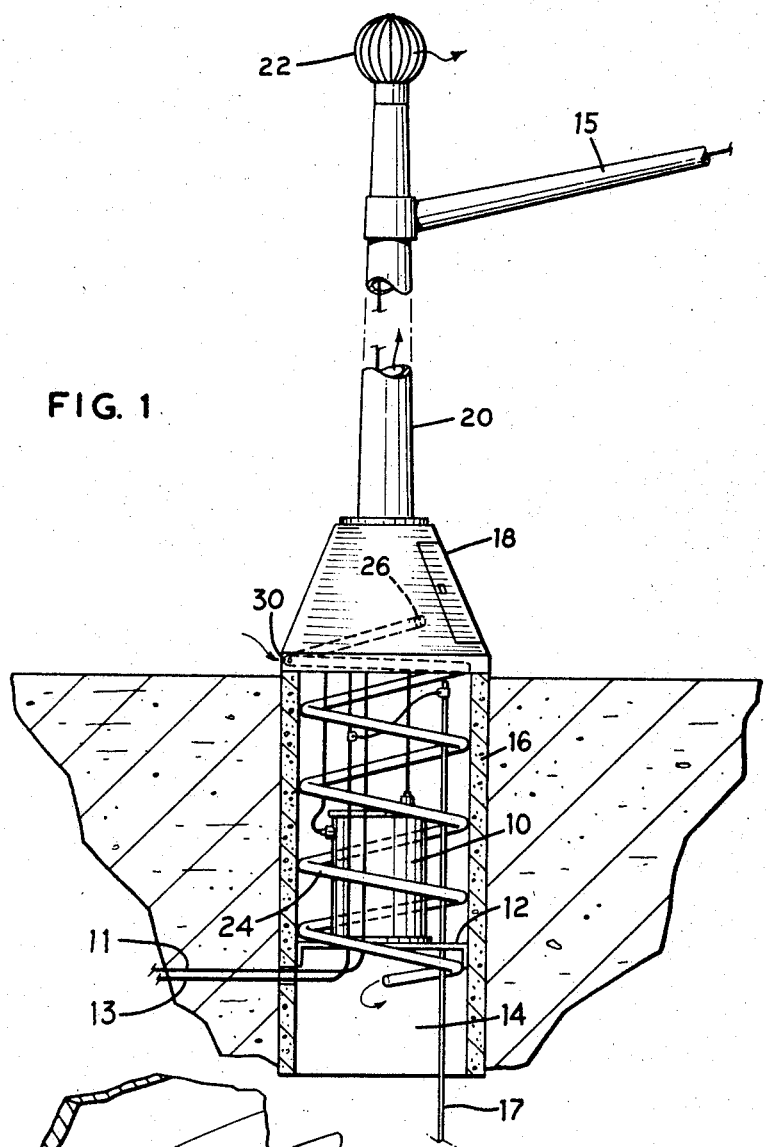
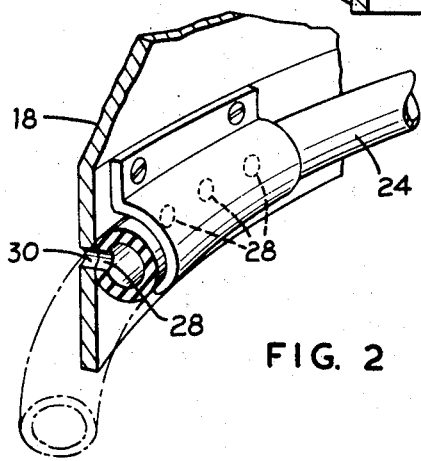
INVENTOR.
H. D. SHORT
BY Featherstonhaugh & Co
ATTORNEYS United States Patent Office 3,420,943
Patented Jan. 7, 1969

3,420,943
VENTILATED UNDERGROUND HOUSING FOR ELECTRICAL APPARATUS
Herbert Douglass Short, New Market, Ontario, Canada, assignor to Lacal Industries Limited, Newmarket, Ontario, Canada
Filed Nov. 9, 1966, Ser. No. 593,143
Claims priority, application Canada, Nov. 9, 1965, 944,174
U.S. Cl. 174—16
Int. Cl. H01b 7/34; H01b 9/06; H02g 9/00
2 Claims

ABSTRACT OF THE DISCLOSURE

This invention is concerned with a ventilated housing for an electrical distribution transformer or like piece of heat producing apparatus that is mounted underground. These chambers usually have a hollow pole extending upwardly therefrom but acts as a chimney for the purpose of conducting heat away from the inside of the chamber. Provision is made for the entry of ventilating air through ventilating openings in the top of the chamber that lead to the bottom of the chamber so that ventilating air can enter the ventilating openings, pass to the bottom of the chamber and then upwardly through the ventilating stack. In this particular invention the air is admitted to the bottom of the chamber by means of a tortuous air intake pipe that is adapted to be tamperproof.

---

This invention relates to an improvement in electrical distribution apparatus wherein heat producing electrical apparatus such as distribution transformers are operated in underground chambers. More particularly, it relates to an improved means for ventilating such chambers to maintain the internal temperature at a safe level.

Modern urban distribution of electricity makes extensive use of subterranean mounted electrical distribution transformers. According to this practice transformers and other apparatus used in the distribution of electrical power for domestic and other uses are mounted in chambers that are below ground level. These chambers usually have a pole extending upwardly therefrom that serves as a street lighting standard. The problem of safely ventilating these chambers is one of considerable concern. The chambers, being close to the ground, are readily accessible by children and care must be taken that the ventilating openings to the interior of the chambers within which the transformer is mounted is not so easy that children can poke wires and the like into the chamber. It will be apparent that a child poking a wire or other metal object into a ventilating opening containing a distribution transformer could suffer very serious consequences.

Moreover, the ventilating path for ventilating air is through ventilating openings in the chamber and upwardly through the hollow stack like pole. In most cases the chamber extends below ground level and the ventilating openings into the chamber are therefore in the top portion of the chamber. For effective ventilation it is necessary that the incoming air be conducted from the intake down to adjacent the bottom of the chamber so that it will have an efficient cooling effect on the heat producing transformer or the like.

It is thus an object of this invention to provide a housing and ventilating stack assembly for a piece of heat producing electrical apparatus such as a distribution transformer that will permit the bulk of the housing to be mounted below ground level and that will provide safe tamperproof ventilation to the interior of the housing and efficient ventilation to carry the heat of the electrical apparatus upwardly through the ventilating stack.

Generally speaking, then the invention relates to electrical distribution apparatus having a housing with a chamber that contains a piece of heat producing electrical apparatus. The housing having a ventilating stack in communication with the chamber and extending upwardly therefrom. The invention is the improvement in such apparatus of a chamber housing formed with the exterior ventilating passage means adjacent the upper end of the heat producing electrical apparatus, a tortuous air intake pipe in the housing communicating with the ventilating passage means at its first end and extending downwardly in the chamber to adjacent the lower end of the heat producing means. The air intake is open at its lower end whereby a ventilating current of air can pass downwardly through the intake pipe to the bottom of the chamber and thence upwardly through a chamber and interior of the pole and out the opening in the pole in use. The invention will be clearly understood after reference to the following detailed specification read in conjunction with the drawings.

In the drawings:
FIGURE 1 is a view partly broken away of an electrical distribution transformer mounted in apparatus according to this invention, and
FIGURE 2 is a fragmentary view showing the mounting of the ventilating tube to the side of the housing chamber.

In the embodiment of the invention illustrated a distribution transformer 10 is mounted on a transversely extending stand 12 in the chamber 14 of a housing that consists essentially of a concrete transformer vault 16 and a service pedestal cap 18 therefor. A pole 20 having a hollow interior communicates with the inside of the chamber 14 and forms a ventilating stack, the interior passage of which communicates with the interior of chamber 14. A spherical rotary ventilator wind powered according to standard practice 22 is mounted on the top of the stack 20 and serves to draw air through the stack from the chamber 14 in use. The foregoing construction is not broadly new. As indicated in the preamble to this specification the subterranean mounting of distribution transformers in chambers of the general type illustrated is old.

This invention is concerned with the ventilating of the chamber 14 in such a way that the chamber remains tamper-proof through the ventilating openings and in a manner that will efficiently cool the transformer. In this respect a tortuous air intake pipe 24, sealed at its upper end as at 26, is formed with air intake holes 28 adjacent its upper end that communicate with through holes in the side of the chamber as at 30. Intake pipe 24 extends spirally downwardly from the intake holes around the transformer 10 to adjacent the bottom of the transformer where its open end communicates with the interior of the chamber 14. In use air passes through the aligned holes 28 and 30 and downwardly through the pipe 24 into the chamber 14 at the bottom of the transformer 10. It then passes upwardly past the heat emitting transformer to carry the heat of the transformer upwardly through the chamber and out the stack 20. In this respect the flow of current is assisted by the rising heat of the transformer 10 and by the operation of the wind powered rotary ventilator 22.

It will be apparent that the unit achieves the objectives of the invention and that it is an advance in the art. Modifications other than the one illustrated will be apparent to those skilled in the art and it is not intended that this invention should be read in a limiting sense.

The standard electrical connections of the transformer are illustrated. Numeral 11 refers to the secondary main cable and service cable. The concentric neutral primary cable is shown at 13. A street light is often mounted on the arm 15 of the pole 20 and is supplied from the output of the transformer 10. Numeral 17 refers to ground rods.

These things are standard practice and not referred to in detail in this application.

The embodiments of the invention in which an exclusive property or privilege is claimed are defined as follows:

1. An underground electricity service device comprising a housing having a chamber, means in said chamber for supporting heat producing electrical apparatus, a pole extending upwardly from the top of said housing and having a hollow interior communicating with said chamber of said housing at its base and communicating with the atmosphere above said housing, intake ventilating holes in the upper part of said housing, a tortuous air intake pipe in said housing having intake openings adjacent one end in communication with said intake ventilating holes in the upper portion of said housing and extending downwardly from said intake openings to adjacent the bottom of said housing, said intake holes having a capacity to provide a ventilating current of air therethrough downwardly through said intake pipe to the bottom of said chamber and thence upwardly through said chamber and hollow interior of said pole and out said opening of said pole in use.

2. An underground electricity service device as claimed in claim 1 in which said air intake pipe extends downwardly as aforesaid in spiral form around the spacing to be occupied by said heat producing electrical apparatus.

References Cited

UNITED STATES PATENTS

| | | | |
|---|---|---|---|
| 1,334,041 | 3/1920 | Lindstrom | 336—57 |
| 3,271,710 | 9/1966 | Leonard | 174—16 X |
| 3,345,449 | 10/1967 | Hiller | 174—16 |
| 3,319,202 | 5/1967 | Lockie | 174—16 |

LEWIS H. MYERS, *Primary Examiner.*

A. T. GRIMLEY, *Assistant Examiner.*

U.S. Cl. X.R.

174—37; 336—59